Figure 1:
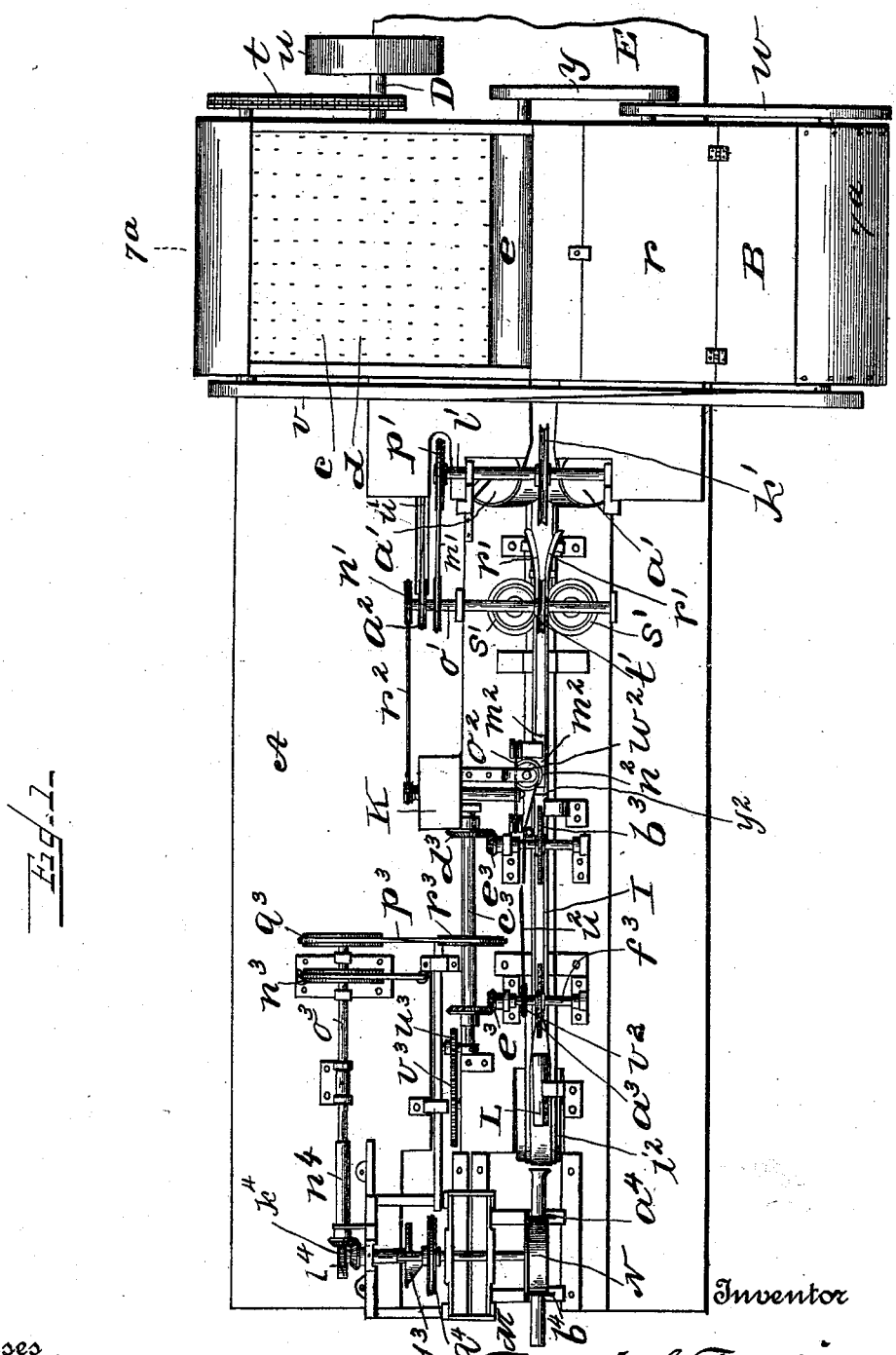

(No Model.)

12 Sheets—Sheet 1.

F. A. FLANEGIN.
CONTINUOUS CIGARETTE MACHINE.

No. 550,101.    Patented Nov. 19, 1895.

Witnesses
Inventor
Francis A. Flanegin.
By D. C. Reinohl
Attorney

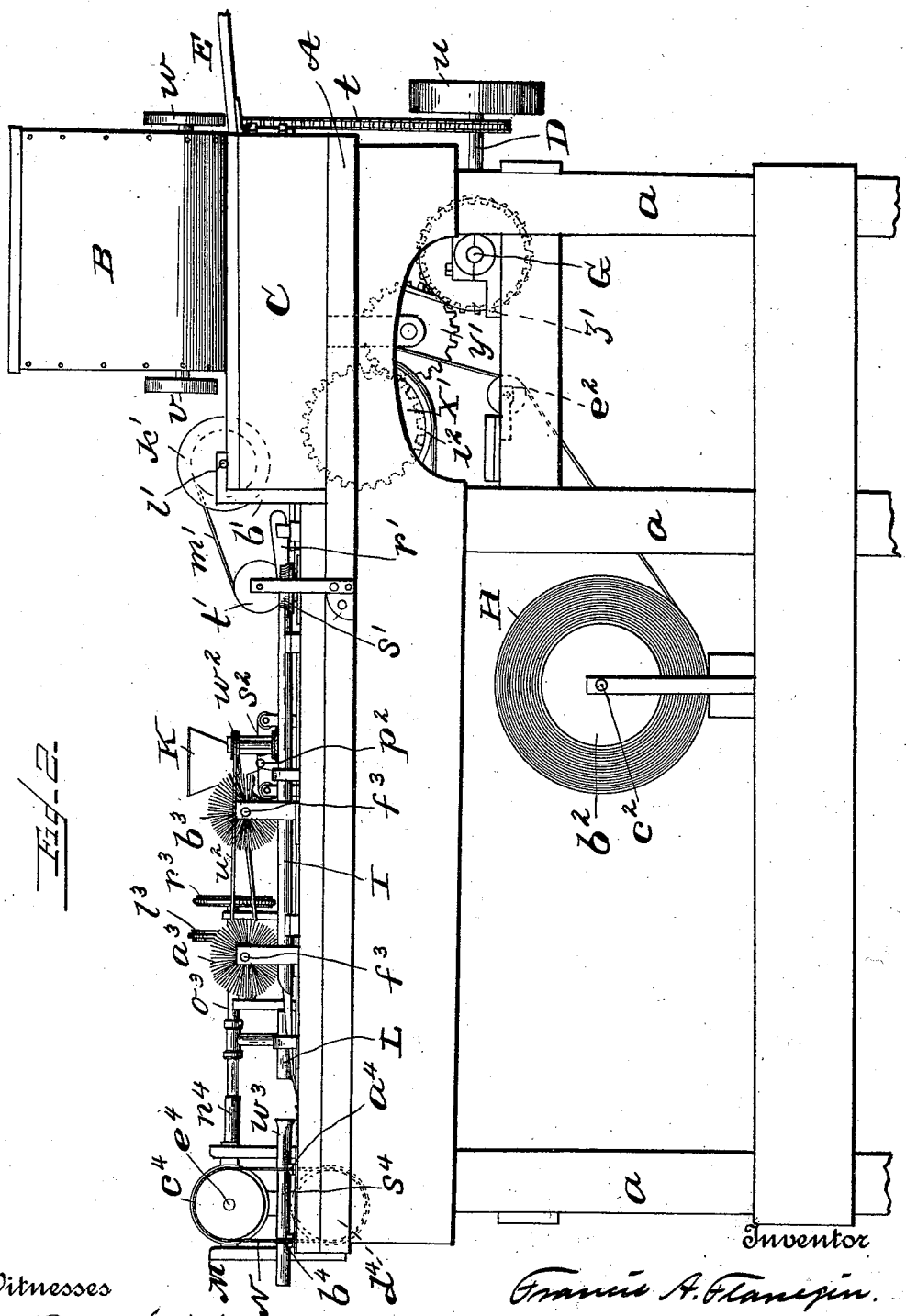

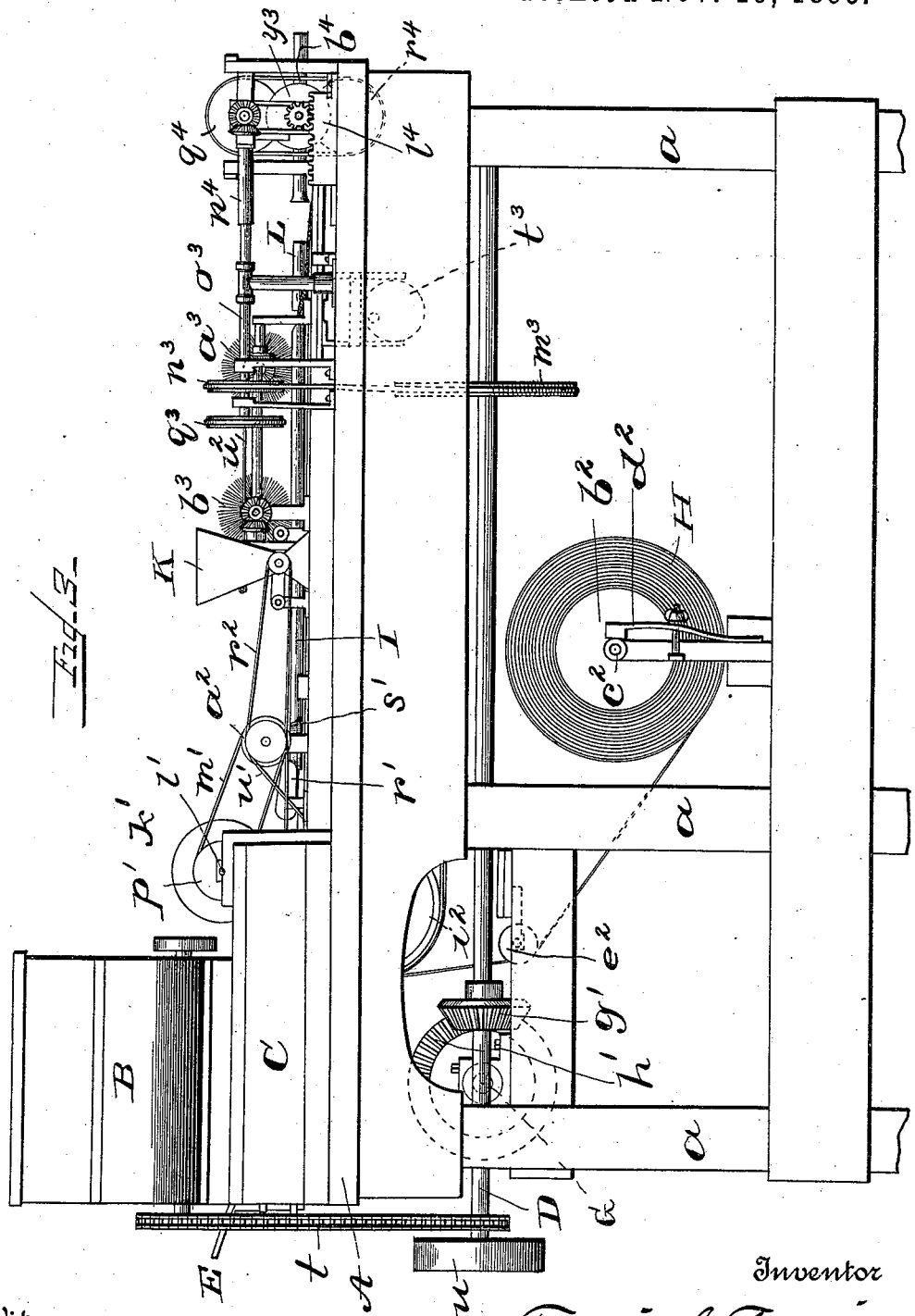

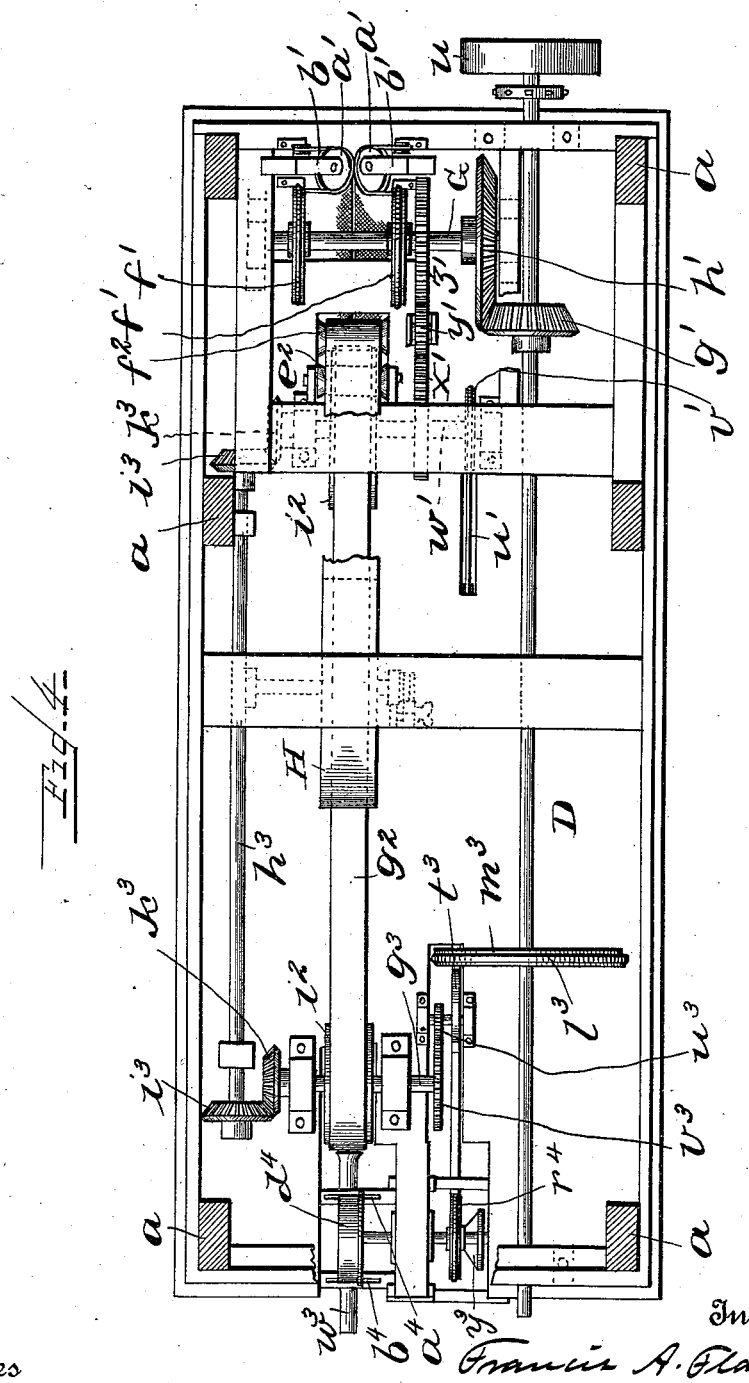

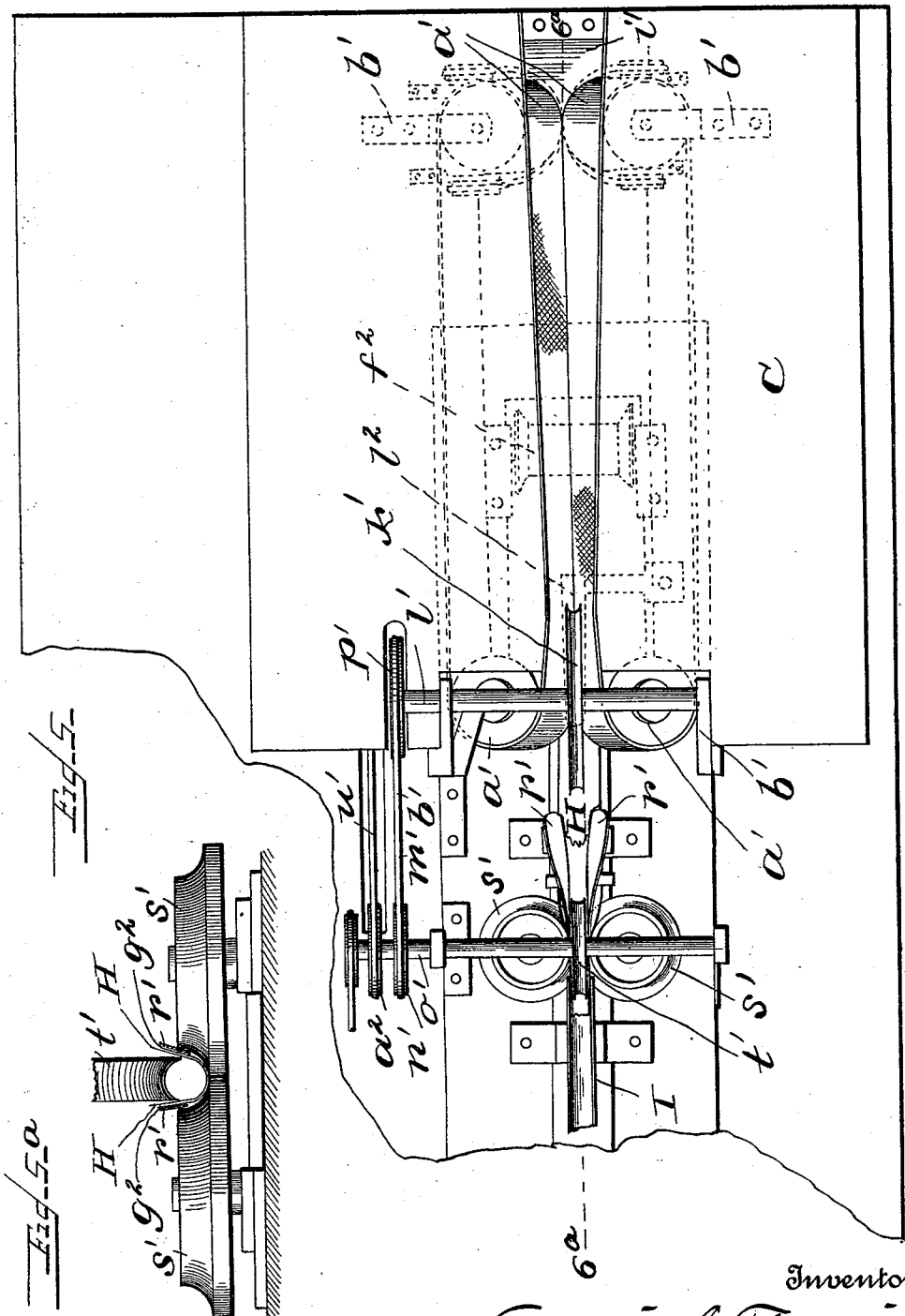

(No Model.)
F. A. FLANEGIN.
CONTINUOUS CIGARETTE MACHINE.
No. 550,101.　　　　　　　Patented Nov. 19, 1895.
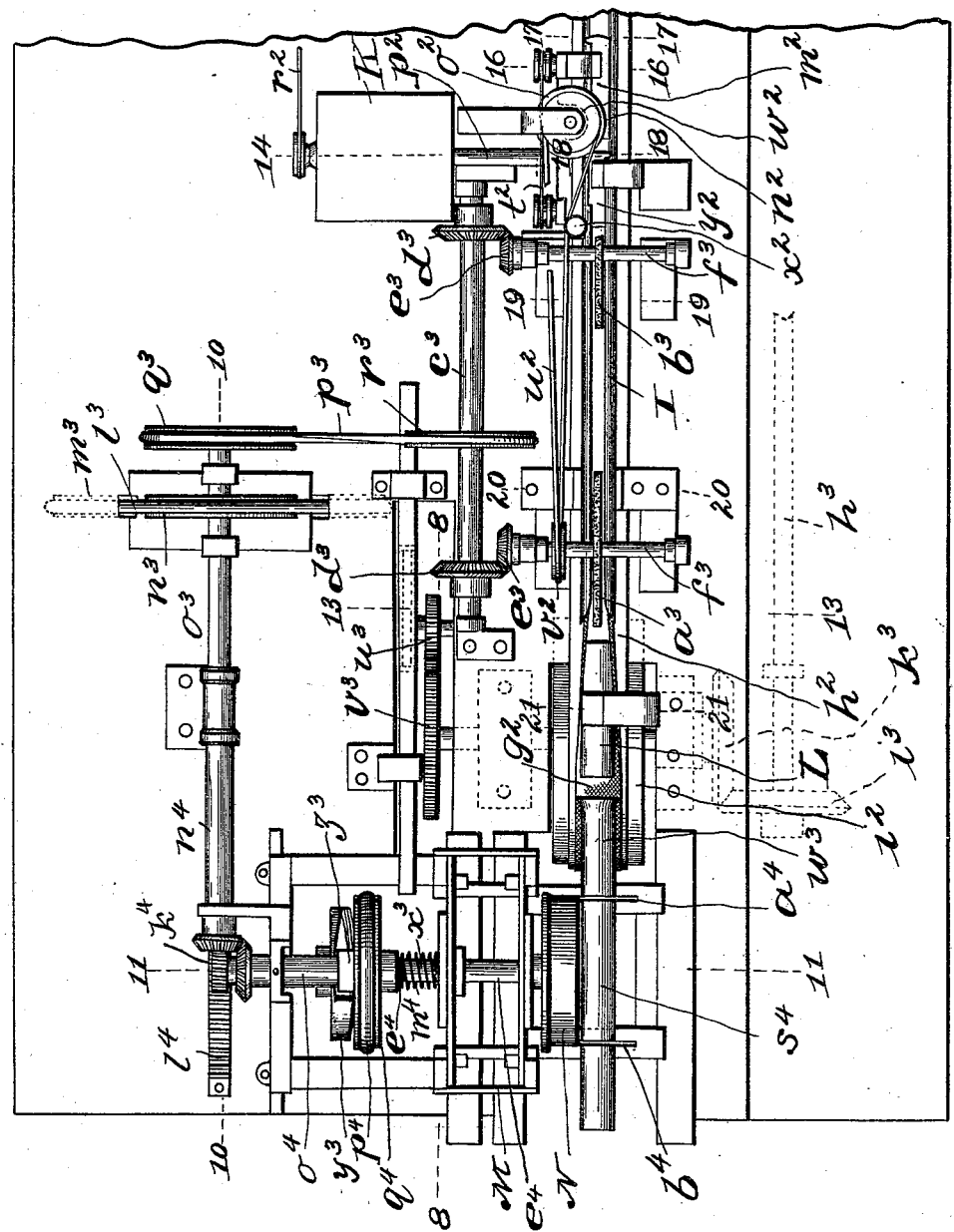
Witnesses
Inventor
Francis A. Flanegin.
By D. L. Reinohl
Attorney

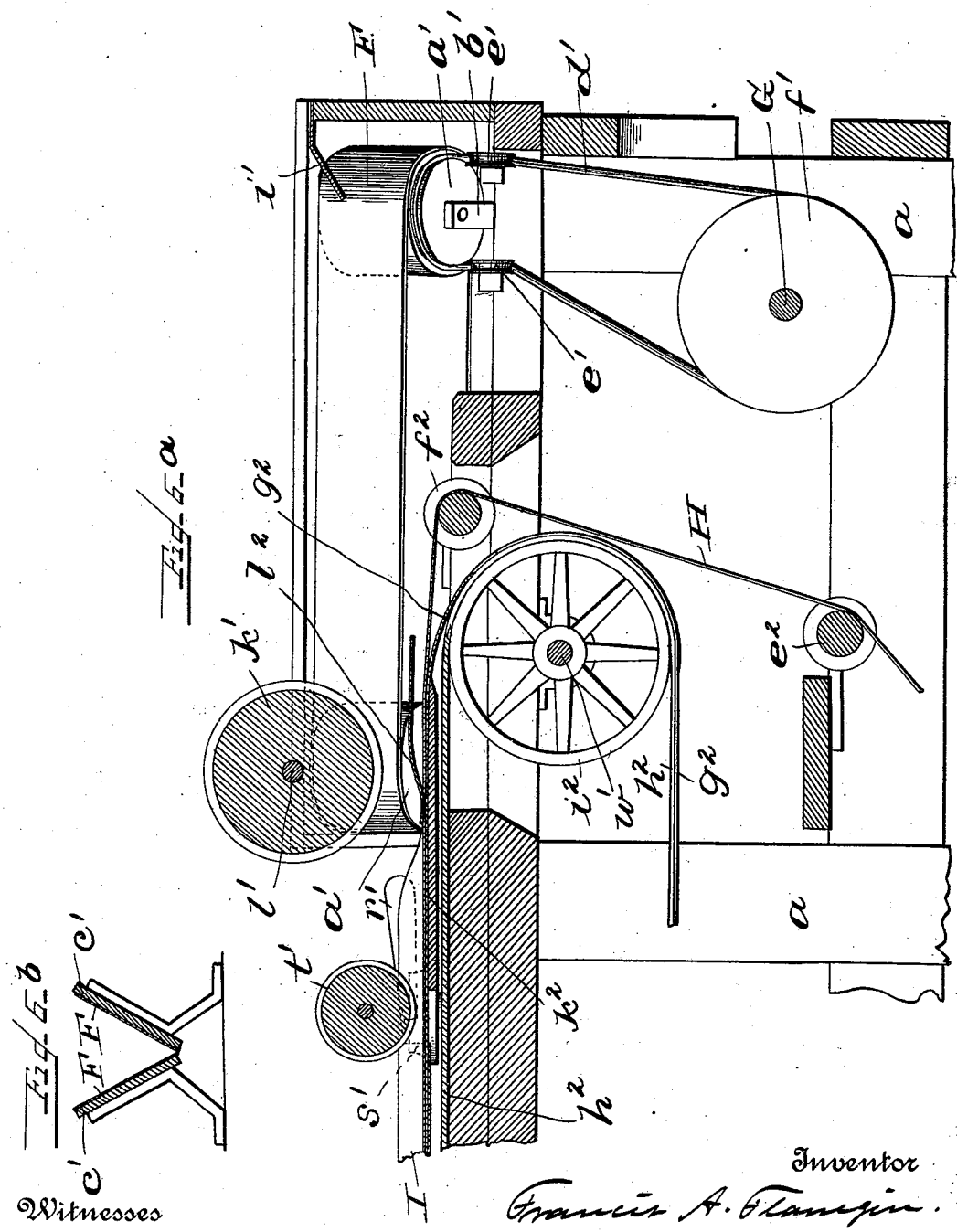

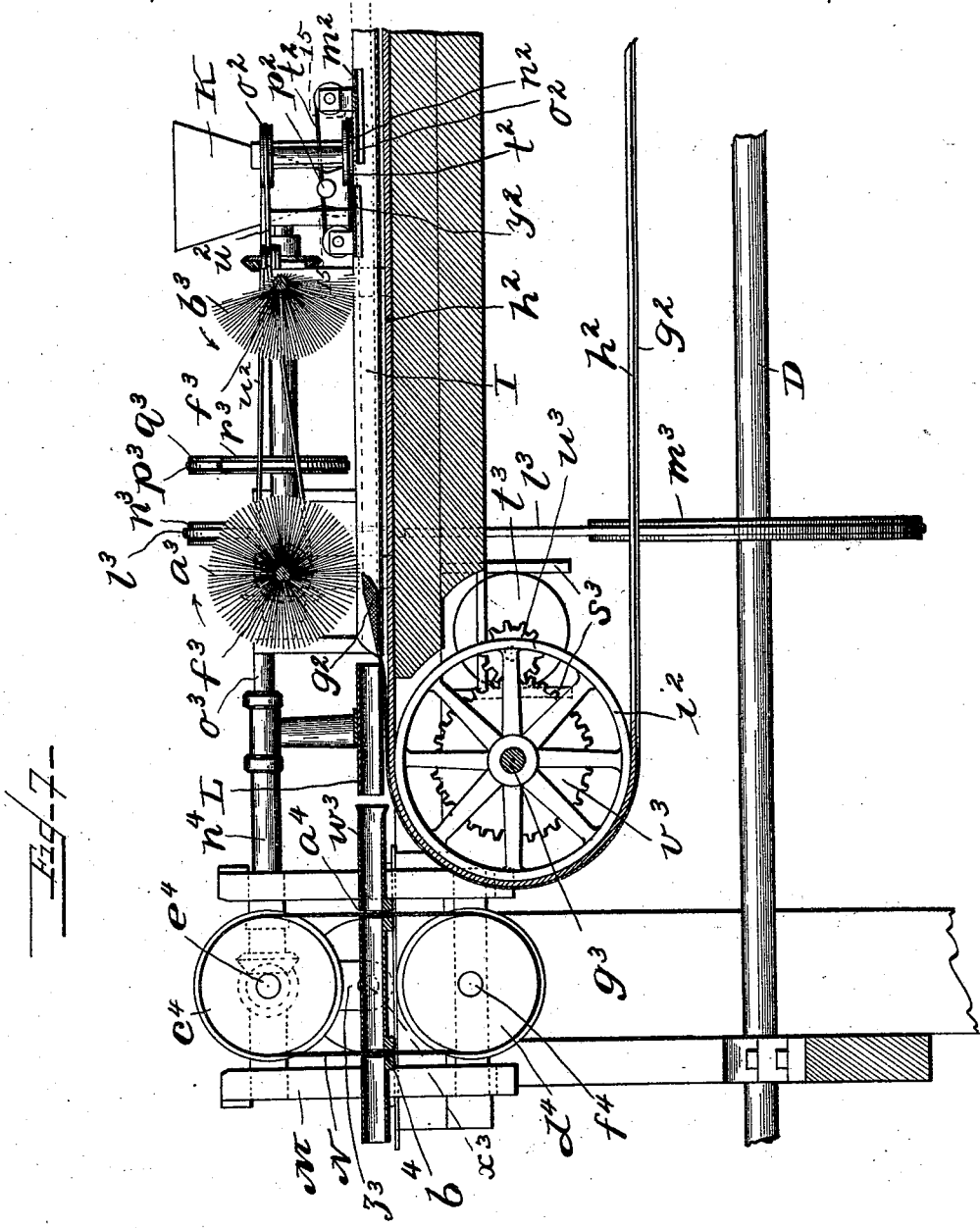

(No Model.) 12 Sheets—Sheet 9.
F. A. FLANEGIN.
CONTINUOUS CIGARETTE MACHINE.
No. 550,101. Patented Nov. 19, 1895.
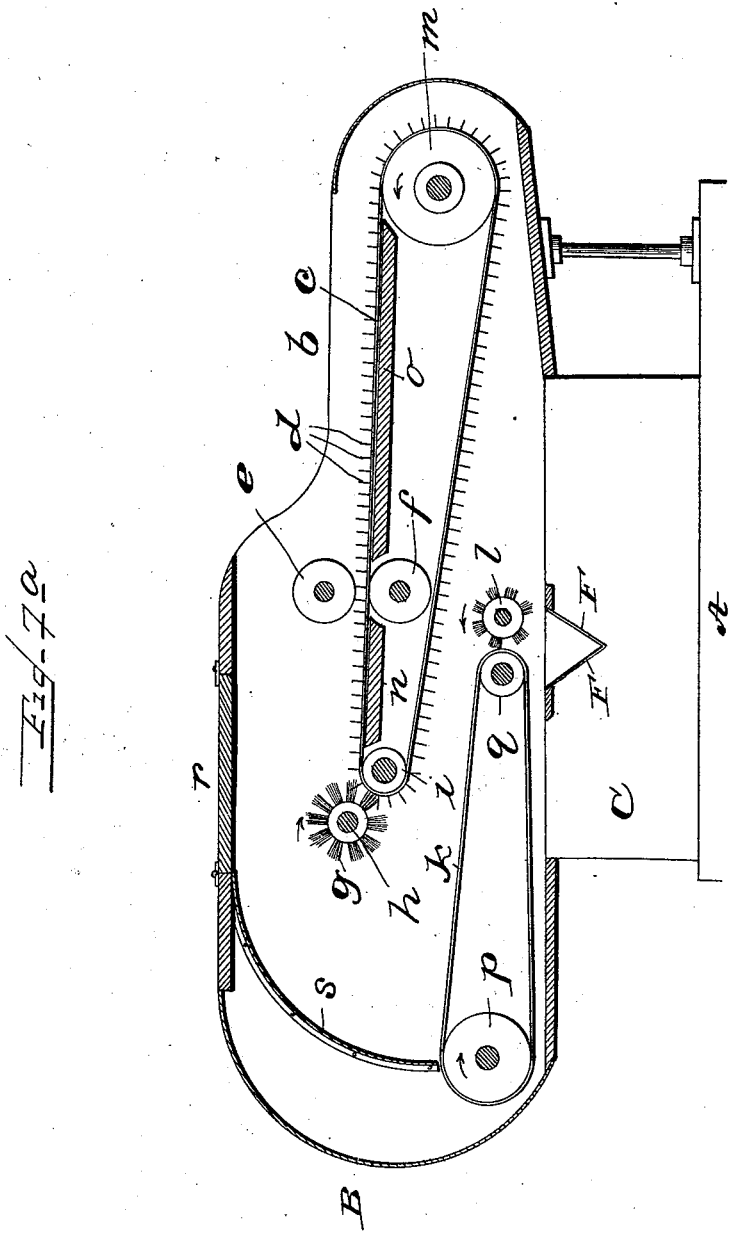
Witnesses
Inventor
Francis A. Flanegin
By D. C. Reinohl
Attorney

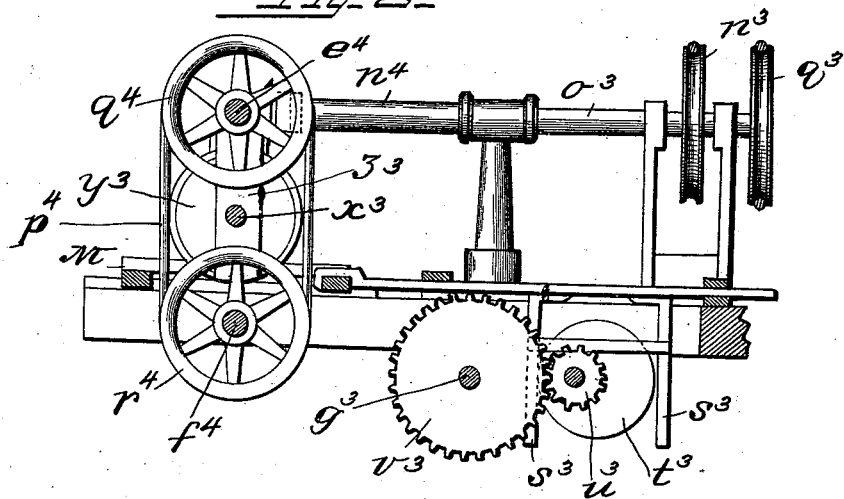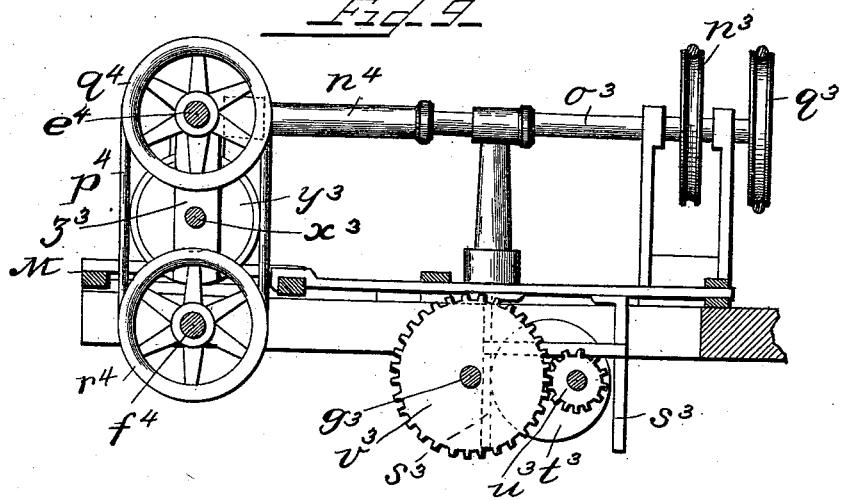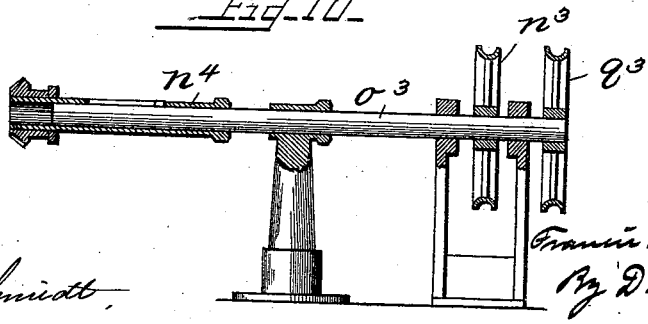

(No Model.) 12 Sheets—Sheet 11.
F. A. FLANEGIN.
CONTINUOUS CIGARETTE MACHINE.
No. 550,101. Patented Nov. 19, 1895.
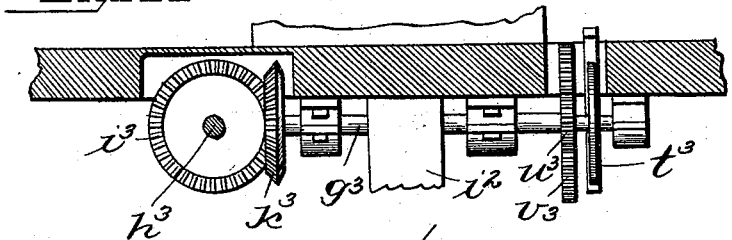
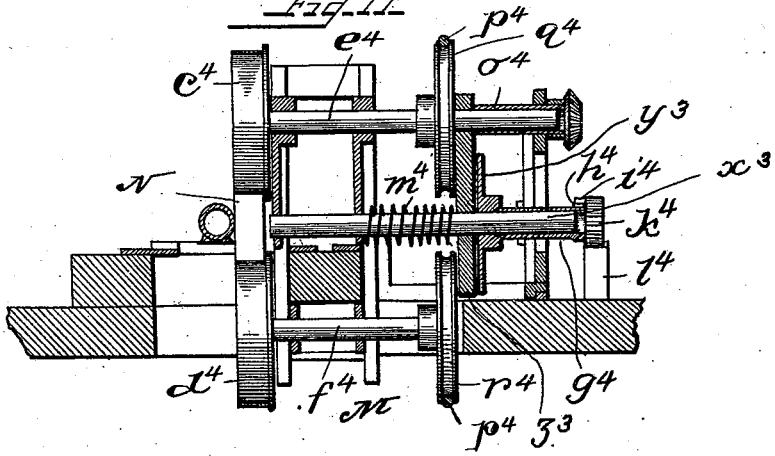
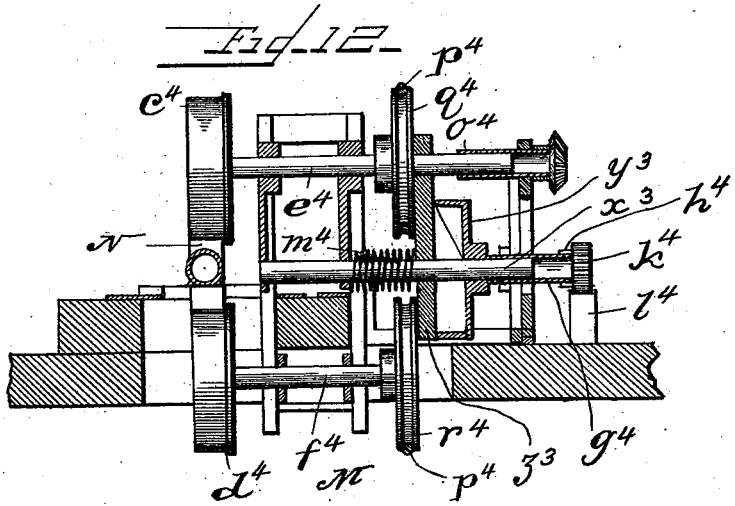

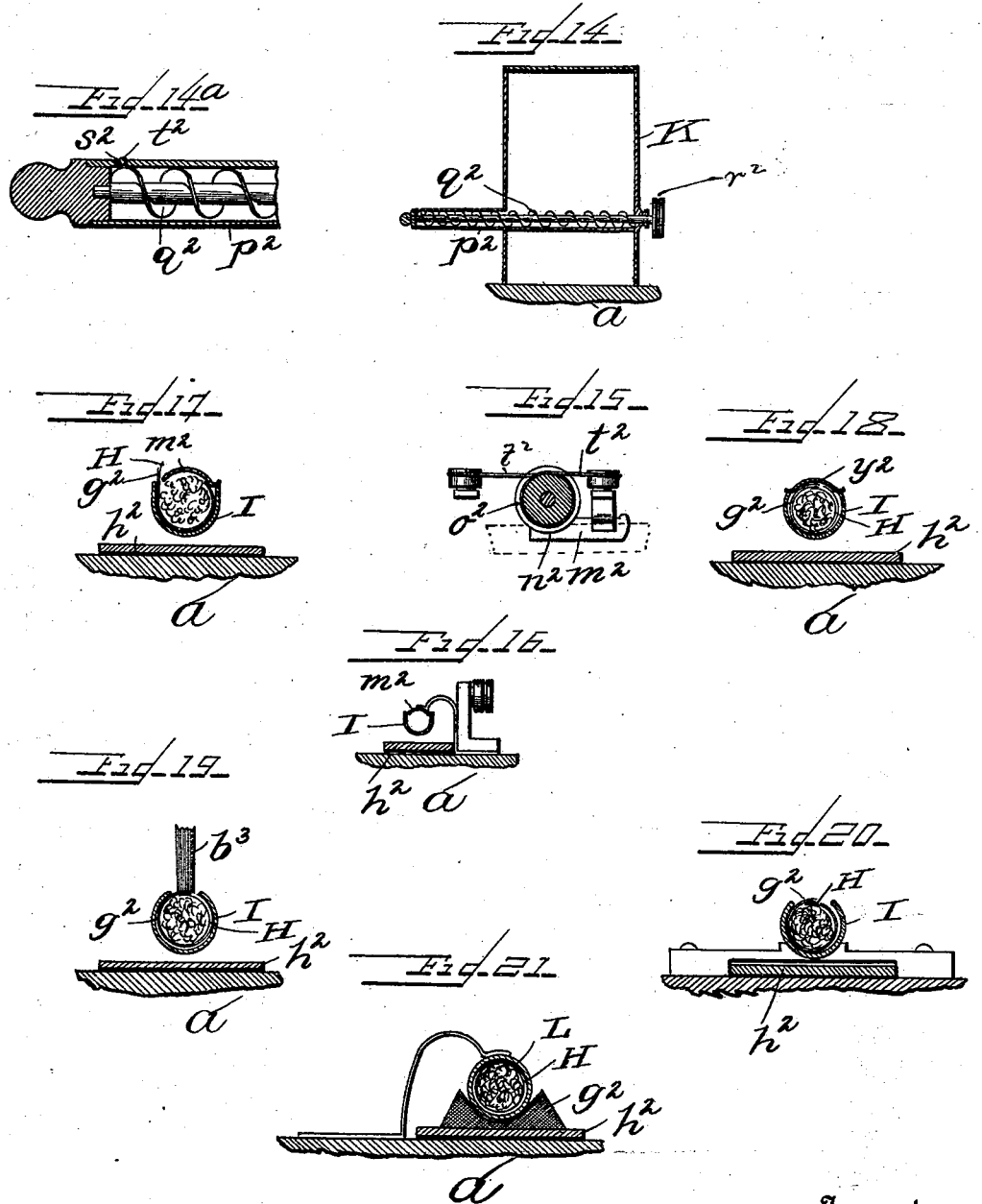

UNITED STATES PATENT OFFICE.

FRANCIS A. FLANEGIN, OF WASHINGTON, DISTRICT OF COLUMBIA, ASSIGNOR TO JOSEPHUS STEPHENS, OF SAME PLACE.

CONTINUOUS-CIGARETTE MACHINE.

SPECIFICATION forming part of Letters Patent No. 550,101, dated November 19, 1895.

Application filed January 5, 1895. Serial No. 533,918. (No model.)

*To all whom it may concern:*

Be it known that I, FRANCIS A. FLANEGIN, a citizen of the United States, residing at Washington, in the District of Columbia, have invented certain new and useful Improvements in Continuous-Cigarette Machines; and I do hereby declare the following to be a full, clear, and exact description of the invention, such as will enable others skilled in the art to which it appertains to make and use the same.

My present invention relates to machines for making cigarettes, and has for its object the construction of a machine for making continuous cigarettes, which will be fully disclosed in the following specification and claims.

In the accompanying drawings, which form part of this specification, Figure 1 represents a top plan view of the entire machine; Fig. 2, a side elevation of the same, showing the left side of the machine from the feed end; Fig. 3, a like view of the opposite side of the machine; Fig. 4, an inverted or bottom plan view showing the mechanism under the top or bed plate of the machine. Figs. 5 and 6 combined represent a top plan view of the machine on an enlarged scale; Fig. $5^a$, an enlarged view of the rollers for reducing the tobacco rod; Fig. $6^a$, an enlarged vertical longitudinal section on line $6^a$ $6^a$, Fig. 5; Fig. $6^b$, a transverse section, on an enlarged scale, through the initial tobacco-rod-forming belts and their supporting-frames; Fig. 7, an enlarged sectional view of the pasting and cutting mechanism; Fig. $7^a$, an enlarged vertical transverse section on the line $7^a$ $7^a$, Fig. 1; Fig. 8, a longitudinal section on the line 8 8, Fig. 6, showing the driving mechanism for the cutter in its normal position; Fig. 9, a like view showing the same after the cutter has passed through and severed the continuous cigarette; Fig. 10, a vertical longitudinal section of the driving mechanism for the cutter on the line 10 10, Fig. 6; Fig. 11, a transverse section on the line 11 11, Fig. 6, showing the cutter in its normal position; Fig. 12, a like view showing the cutter in position after it has severed the continuous cigarette; Fig. 13, a transverse section on the line 13 13, Fig. 6, looking in the direction of the cutting mechanism and showing said mechanism; Fig. 14, a vertical transverse section through the paste-receptacle on line 14 14, Fig. 6; Fig. $14^a$, an enlarged vertical longitudinal section of the extension of the paste-receptacle and its conveyer; Fig. 15, a horizontal section on the line 15 15, Fig. 7, showing the disk for applying paste to the wrapper; Fig. 16, a transverse section on the line 16 16, Fig. 6, showing the primary folding-tube; Figs. 17, 18, 19, 20, and 21, enlarged transverse sections on the corresponding lines, Fig. 6, showing the continuous cigarette in its different stages in the forming-tube.

Reference being had to the drawings and the letters thereon, A indicates the top or bed plate of the frame of the machine and is supported upon suitable legs $a$.

At the head of the machine and crossing it transversely is the tobacco-feeding apparatus, which consists of a rectangular case B, supported upon the raised portion C of the machine, which surrounds the tobacco-rod forming and conveying belts. The case is open at $b$ to drop tobacco upon the apron $c$, which is provided with metal spurs $d$, set at a right angle to the plane or face of the apron to hold the tobacco, and the tobacco is pressed into the spaces between the spurs by a roller $e$, while the apron is supported underneath by a roller $f$, and the tobacco is combed out of the spaces between the spurs by a wire brush $g$, which is supported upon a shaft $h$ and engages the tobacco as the apron is rounding the inner pulley $i$ and delivers the tobacco upon a conveyer $k$, from which it is delivered into the space between the tobacco-rod forming and conveying belts by the brush $l$. The apron $c$ is supported by the pulleys $i$ and $m$, and the upper side is prevented sagging by transverse supports $n$ $o$, and the conveyer $k$ is supported upon pulleys $p$ $q$. The case B is provided with a door $r$ to afford access to the interior and a guard $s$ to prevent tobacco getting under the conveyer $k$. The pulley $m$ is driven by a belt $t$, which engages a pulley $l$ on the main driving-shaft D, which is provided with a pulley $u$, and pulley $p$ is driven by belt $v$, and the brush $g$ by the belt $w$, and the brush $l$ by belt $y$, and are best shown in Fig. 1. This feeding apparatus may, however, be dispensed with and the tobacco rod formed in the rough by hand upon a table adjacent to the machine or attached thereto, as shown at E in Figs. 1, 2, and 3.

The main drive-shaft D extends throughout the entire length of the machine, and from it power is transmitted to the several parts, as will hereinafter fully appear.

F F indicate the tobacco-rod forming and conveying belts, which are set at an angle to each other and to a horizontal plane converge toward each other laterally and longitudinally and form a V-shaped space between them and are supported upon pulleys $a'$ $a'$, which are supported upon brackets $b'$ $b'$, and behind each belt and between the pulleys $a'$ $a'$ is a supporting-frame $c'$, which converges in the same direction as the belts and supports the belts while the initial tobacco rod is being formed by the belts. The convergence of the belts F is shown in Figs. 5 and $6^a$. The belts F are driven by belts $d'$, which engage the pulleys $a'$ $a'$ at their lower ends, cross idlers $e'$, and engage pulleys $f'$ on the counter-shaft G, which is connected to the main shaft D by miter gear-wheels $g'$ $h'$. (Shown in Figs. 3 and 4.) The converging space between the belts F F is provided at its outer end by a plate $i'$ to prevent tobacco falling through, and at the front end of said space is a wheel $k'$, having a groove in its periphery, and is supported upon a shaft $l'$, so as to project down nearly to the lower edge of the belts to press the initial tobacco rod down to the bottom of the V-shaped space, and is revolved by belt $m'$, which engages pulley $n'$ on shaft $o'$ and pulley $p'$ on shaft $q'$, which also supports the wheel $k'$.

The initial tobacco rod having been formed between the belts F F, it passes under the wheel $k'$ and is delivered upon the paper H between the fenders $r'$ $r'$ and is conducted between the horizontal wheels $s'$ $s'$ and the vertical wheel $t'$, which reduce the tobacco rod to a diameter a little less than the diameter of the completed cigarette, to enable the completed tobacco rod to pass through the forming-tube I with as little friction as possible. The wheels $s'$, $s'$, and $t'$ are provided with concave peripheries, which, in conjunction with each other, form a cylindrical passage, to compress the initial tobacco rod into a cylindrical body and complete the formation of the tobacco rod, as shown in Fig. $5^a$, and the wheel $t'$ is driven by a belt $u^2$, driven by a pulley $v'$ on shaft $w'$, which shaft is driven by gear-wheels $x'$, $y'$, and $z$, the latter being secured on shaft G. The belt $u'$ engages pulley $a^2$ on the shaft $o'$.

The paper H is supported upon a spool $b^2$, the shaft $c^2$ of which is provided with a friction-brake $d^2$, to regulate the tension of the paper as it passes through the machine, and from the spool $b^2$ the paper passes over roller $e^2$, thence over roller $f^2$, and forward upon the endless tape or apron $g^2$, which supports the paper, and is folded or bent up laterally to engage the continuous cigarette-rod and draw it through the folding-tube I. The endless tape or apron $g^2$ runs in frictional contact with the wheels $s'$ $s'$ and revolves them as the initial tobacco rod lying upon the paper strip is drawn through the space between said wheels, and the belt is propelled by a tape $h^2$, which runs on pulleys $i^2$ $i^2$ and is supported upon a bar $k^2$, which also separates the two belts, as shown in Fig. $6^a$. After the wrapper and the continuous-cigarette rod enter the tube I the tape requires no other support. The paper is guided and held down upon the bar $k^2$ by a finger $l^2$, which is pivotally secured to the frame of the machine, and the paper is bent up on its edges into U shape as it engages the fenders $r'$, as shown on one of its edges in Fig $6^a$, and passes between the initial tobacco-rod-reducing wheels $s'$, $s'$, and $t'$ in the same position as shown in Fig. $5^a$. Should the paper strip run too high up on the right or left fender $r'$, the narrow end of the finger $l^2$ is moved correspondingly toward the right or left, which causes the paper to move toward the opposite fender. The initial fold is given to the right-hand edge of the paper inward from U shape by a curved plate $m^2$, (shown in Figs. 1, 6, 15, 16, and 17,) which bends the paper wrapper over and inward on the upper side of the continuous-cigarette rod, so that the inner surface of the left-hand edge of the paper strip will engage the inclined surface $n^2$ of the paste-distributing disk $o^2$. This folding-plate $m^2$ is placed as near the reducing-wheels as can be to prevent the tobacco rod expanding before it passes under said plate, and the paper is folded around it, and the plate is shown in transverse section in Fig. 15.

The paste is contained in a receptacle K, which is provided with a tubular extension $p^2$, in which is a spiral feeder $q^2$, which is revolved by a belt $r^2$ to feed the paste forward to the outer end of said tube, from which it is taken through a slot $s^2$, by a cord conveyer $t^2$ and deposited upon the inclined surface $n^2$ of the distributing-disk $o^2$. The disk $o^2$ is revolved by a belt $u^2$, which is supported upon a vertical pulley $v^2$ and a horizontal pulley $w^2$, with an idler $x^2$ interposed to prevent the belt running off the pulleys, and the conveyer $t^2$ is crossed and surrounds the hub of the distributing-disk $o^2$. After the paste has been applied to the paper wrapper the final fold is effected by a plate $y^2$, which is on the opposite side of the tube I and beyond the plate $m^2$, and is shown in enlarged cross-section in Fig. 18, and the paper pressed down upon the body of the continuous cigarette and brushed to expel any excess of the paste or air and to unite the fold of the wrapper with the body of the paper and the friction produced expedites the drying of the paste, which latter operation is effected by brushes $a^3$ $b^3$, which are revolved in opposite directions, as indicated by arrows on Fig. 7, and engage the pasted portion of the wrapper through the longitudinal open space or slot in the upper side of the tube I to prevent any puckering of the pasted lapped seam on the continuous cigarette. The belt $u^2$ and the brushes $a^3$ and $b^3$ are driven by shaft $c^3$, which is provided with miter gear-wheels $d^3$, which engage like wheels $e^3$ $e^3$ on the shaft $f^3$, which support the brushes.

The shaft $w'$ supports the pulley $i^2$ below the belts F F, and from said shaft power is transmitted to the shaft $g^3$, through the medium of shaft $h^3$ and miter gear-wheels $i^3$ $i^3$ $k^3$ $k^3$ to propel the belt $h^2$, as shown in Fig. 4.

The continuous cigarette now having been pasted, the belt $g'$ leaves the cigarette at the end of the forming-tube I, as shown in Fig. 7, and the belt then flattens out as it passes the supporting-tube L, as shown in Fig. 6, and passes over the pulley $i^2$ near the cutting end of the machine and travels back toward the head of the machine to repeat its work. After leaving the forming-tube I the continuous cigarette enters the supporting-tube L, which is a short separate tube about or a little less than the length of a completed cigarette, wherein it is partly supported while the continuous cigarette is being severed into cigarettes of the usual length.

The cutting apparatus to sever the continuous cigarette is driven by a belt $l^3$, engaging pulley $m^3$ on the main shaft D and a pulley $n^3$ on the counter-shaft $o^3$, from which shaft $o^3$ the shaft $c^3$ is driven by a crossed belt $p^3$, which engages pulley $q^3$ on shaft $o^3$ and pulley $r^3$ on shaft $c^3$, as shown in Fig. 6. This apparatus comprises a frame or carriage M, having depending arms $s^3$ $s^3$, which are engaged by a cam $t^3$, which is revolved by a pinion $n^3$, which engages a master-wheel $v^3$ on the shaft $g^3$ to reciprocate the frame and the continuous or endless cutting-knife N longitudinally on the top of the machine, as shown in Figs. 1, 4, 6, 8, and 9. The carriage carries the cutting-knife with it, and as the continuous cigarette is moving outward from the forming-tube I and tube L the carriage M, with its band-cutter N, is moving in the opposite direction, or inward, on the machine, and the short tube $w^3$, which is supported by the carriage, slides upon the continuous cigarette, and while the carriage is moving outward the shaft $x^3$, with its cam $y^3$ bearing upon the bar $z^3$, pushes the cutter forward transversely toward the continuous cigarette and severs it at $a^4$ $b^4$, the cutting motion being in opposite directions—that is to say, the knife cutting motion being downward at $a^4$ and upward at $b^4$ as the cutter travels. The continuous band-cutter N, which resembles a band-saw, is supported upon two pulleys or disks $c^4$ $d^4$ upon shafts $e^4$ $f^4$, which are supported in suitable bearings on the carriage in the manner of supporting a band-saw, and in the operation of cutting a continuous cigarette presents about seventeen inches of cutting-surface. The cam $y^3$ is double-faced and inclined in opposite directions, as shown in Figs. 6, 11, and 12, and is provided with a sleeve $g^4$, having a ratchet-wheel $h^4$ on its outer end, which is engaged by a pawl $i^4$, secured to the pinion $k^4$, which is secured to the outer end of the shaft $x^3$, which revolves the cam by engaging the toothed rack $l^4$ in the outstroke of the carriage. As soon as the cam has pushed the cutter forward and severed the continuous cigarette, it is instantly pushed back to its normal position by a coiled spring $m^4$ upon the shaft $x^3$, where it remains until again pushed forward by the cam $y^3$, and in the return stroke of the shaft $x^3$ the cam $y^3$ does not change the position it assumed when released from the bar $z^3$, and the opposite incline is ready to engage the bar and again push the cutter forward.

The normal position of the carriage is shown in Fig. 8, and in Fig. 9 it is shown at the end of its outward stroke or movement, and in Fig. 11 the band-cutter is shown in its normal position, and in Fig. 12 it is shown as it has passed through and severed the continuous cigarette.

To accommodate the longitudinal movement of the carriage, the shaft $o^3$ is provided with an extension-joint $n^4$, and to provide for the transverse movement of the cutter N the shaft $e^4$ is provided with like joint $o^4$, as shown in Fig. 6, and the cutter is driven by a belt $p^4$ engaging pulleys $q^4$ $r^4$.

While the continuous cigarette is being cut into two cigarettes at each stroke, the former is supported in the transversely-separated tube $s^4$.

Having thus fully described my invention, what I claim is—

1. In a machine for making continuous cigarettes, a pair of initial tobacco-rod forming and conveying belts set at an angle to each other and to a horizontal plane and forming a V shaped space between the belts whose lower edges are in engagement substantially throughout their working length, in combination with means for supporting the paper strip in front of the discharge end of said belts to receive the initial tobacco-rod upon the paper as it is discharged from the rod-forming belts by the separation thereof.

2. In a machine for making continuous cigarettes, a pair of initial tobacco-rod forming and conveying belts set at an angle to each other and to a horizontal plane and forming a V shaped space between the belts whose lower edges are in engagement substantially throughout their working length, in combination with a revoluble wheel projecting into said space and means for supporting the paper strip under the discharge end of the belts to receive the initial tobacco-rod as it is discharged therefrom by the separation of said belts.

3. In a machine for making continuous cigarettes, a pair of initial tobacco-rod forming and conveying belts set at an angle to each other and to a horizontal plane and forming a V shaped space between the belts whose lower edges are in engagement substantially throughout their working length, in combination with a revoluble wheel having a groove in its periphery and projecting into said space and means for supporting the paper strip under the discharge end of the belts to receive the initial tobacco-rod as it is discharged therefrom by the separation of said belts.

4. In a machine for making continuous cigarettes, a pair of initial tobacco-rod forming and conveying belts set at an angle to each other and to a horizontal plane and forming a V shaped space between the belts whose lower edges are in engagement substantially throughout their working length, in combination with supporting frames for said belts, a revoluble wheel projecting into the space between the belts and means for supporting the paper strip under the discharge end of the belts to receive the initial tobacco-rod as it is discharged therefrom by the separation of said belts.

5. In a machine for making continuous cigarettes, a pair of initial tobacco-rod forming and conveying belts converging toward each other transversely and longitudinally and having their lower edges in engagement substantially throughout their working length, in combination with supports for said belts and a revoluble wheel between the belts and near the delivery end thereof.

6. In a machine for making continuous cigarettes, a pair of initial tobacco-rod forming and conveying belts converging toward each other transversely and longitudinally and having their lower edges in engagement substantially throughout their working length and means for retaining said belts in working relation, in combination with a revoluble wheel projecting into the space between said belts whose lower edges are in engagement substantially throughout their working length.

7. In a machine for making continuous cigarettes, a pair of initial tobacco-rod forming and conveying belts converging toward each other transversely and longitudinally and having the lower edges of the belts in engagement substantially throughout their working length, in combination with corresponding converging supporting frames for said belts, whose lower edges are in engagement substantially throughout their working length and a wheel projecting into the space between the belts.

8. In a machine for making continuous cigarettes, means for forming an initial tobacco-rod, in combination with a pair of horizontal wheels and a vertical wheel above and between said wheels and having concave peripheries whereby a cylindrical passage is formed between the said wheels to reduce the rod to a diameter less than the diameter of the completed cigarette.

9. In a machine for making continuous cigarettes, means for forming an initial tobacco-rod, in combination with a pair of horizontal wheels having grooved peripheries, a vertical wheel above and between said wheels and having a grooved periphery forming a passage between said wheels to reduce the initial tobacco-rod, and a continuous tape intermediate and engaging the peripheries of said horizontal wheels and supporting the paper strip.

10. In a machine for making continuous cigarettes, a pair of belts converging toward each other longitudinally and transversely and having their lower edges in engagement substantially throughout their working length, and a revoluble wheel between said belts for forming an initial tobacco-rod, in combination with a device contiguous thereto for reducing said rod to a diameter less than the diameter of the completed cigarette and a continuous tape for engaging and conveying the continuous cigarette.

11. In a machine for making continuous cigarettes, a pair of belts converging toward each other longitudinally and transversely and having their lower edges in engagement substantially throughout their working length, and a revoluble wheel between said belts for forming an initial tobacco-rod, a supporting belt, a continuous tape for engaging the continuous cigarette and propelled by the supporting belt, and means for folding the wrapper around the tobacco-rod, in combination with a device for supplying paste to said wrapper.

12. In a machine for making continuous cigarettes, a pair of belts converging toward each other longitudinally and transversely and having their lower edges in engagement substantially throughout their working length, and a revoluble wheel between said belts for forming an initial tobacco-rod, a supporting belt, a continuous tape for engaging the continuous cigarette rod and propelled by the supporting belt, means for reducing the diameter of the tobacco rod and means for supplying a wrapper and folding it around said rod in combination with a device for supplying paste to said wrapper.

13. In a machine for making continuous cigarettes, a paste receptacle provided with an extension having a slot therein, a feeder in said extension, and a revoluble paste distributer separate from the paste receptacle, in combination with a cord for conveying the paste from said slot to said distributer.

14. In a machine for making cigarettes, a paste receptacle provided with an extension having a slot in the outer end thereof, a feeder in said extension and a horizontal revoluble paste distributer, in combination with an endless cord for conveying paste from said slot to said distributer.

15. In a machine for making cigarettes, a paste receptacle, provided with an extension having a feeder therein and a horizontal revoluble paste distributer and means to drive the same, in combination with a cord paste conveyer supported upon bearings of different heights and extending from said extension to and around a boss on said distributer.

16. In a machine for making cigarettes, means for forming a tobacco-rod, and means for applying and pasting the wrapper in combination with a tube having a slot in its upper side, a pair of oppositely revoluble brushes for engaging the pasted seam while in said tube and revolving in the vertical plane of the continuous cigarette.

17. In a machine for making cigarettes, a vertical and endless band cutter, revoluble and reciprocating shafts supporting said cutter, in combination with a frame supporting said shafts, means for propelling the cutter and means for imparting longitudinal motion to the frame and lateral motion to the shafts, and a cigarette supporting tube.

18. In a machine for making cigarettes, a vertical and endless band cutter, a frame supporting said cutter, means for propelling the cutter and means for imparting longitudinal reciprocating motion to said frame and lateral reciprocating motion to said shafts and a laterally slotted and reciprocating cigarette supporting tube connected to and reciprocated by said frame.

19. In a machine for making cigarettes, a reciprocating cigarette supporting tube provided with a plurality of lateral slots, an endless band cutter constructed and arranged to sever a continuous cigarette at both ends and in opposite directions simultaneously, in combination with means for moving said cutter longitudinally and laterally and means for propelling the cutter.

20. In a machine for making cigarettes, an endless band cutter, in combination with means for imparting longitudinal and lateral motion thereto and means for propelling the cutter provided with extension joints.

21. In a machine for making cigarettes, an endless band cutter, means for propelling said cutter and means for imparting longitudinal reciprocating motion thereto, in combination with means for moving the cutter laterally, a retractile spring for returning the cutter and a longitudinally reciprocating cigarette supporting device.

22. In a machine for making cigarettes, an endless and traveling band cutter, means for propelling the cutter and means imparting longitudinal reciprocating motion thereto, means for moving the cutter laterally and means for returning the cutter instantaneously, in combination with a laterally slotted cigarette supporting tube.

In testimony whereof I affix my signature in presence of two witnesses.

FRANCIS A. FLANEGIN.

Witnesses:
D. C. REINOHL,
D. WEIMER REINOHL.